US012280702B2

(12) United States Patent
Jeon et al.

(10) Patent No.: US 12,280,702 B2
(45) Date of Patent: Apr. 22, 2025

(54) ASSIST GRIP AND VEHICLE INCLUDING THE SAME (71) Applicants: Hyundai Motor Company, Seoul (KR); Kia Corporation, Seoul (KR); HL Klemove Corp., Incheon (KR)

(72) Inventors: Seul Ki Jeon, Gyeonggi-do (KR); Eung Hwan Kim, Seoul (KR); Han Yeol Yu, Gyeonggi-do (KR); Beom Sic Yoo, Gyeonggi-do (KR); Kyung Jin You, Gyeonggi-do (KR); Jae Ho Huh, Seoul (KR)

(73) Assignees: Hyundai Motor Company, Seoul (KR); Kia Corporation, Seoul (KR); HL Klemove Corp., Incheon (KR)

( * ) Notice: Subject to any disclaimer, the term of this patent is extended or adjusted under 35 U.S.C. 154(b) by 297 days.

(21) Appl. No.: 17/954,875

(22) Filed: Sep. 28, 2022

(65) Prior Publication Data

US 2023/0166647 A1 Jun. 1, 2023

(30) Foreign Application Priority Data

Nov. 30, 2021 (KR) .................. 10-2021-0169195

(51) Int. Cl.
*B60N 3/02* (2006.01)
*B60N 2/00* (2006.01)
*B60R 21/015* (2006.01)

(52) U.S. Cl.
CPC ........... *B60N 3/023* (2013.01); *B60N 2/0022* (2023.08); *B60R 21/01538* (2014.10); *B60N 2210/20* (2023.08)

(58) Field of Classification Search
CPC .......... B60N 3/02; B60N 3/023; B60N 3/026; B60N 2210/20; B60R 21/01538
See application file for complete search history.

(56) References Cited

U.S. PATENT DOCUMENTS

| 8,641,117 B2 | 2/2014 | Abe et al. | |
|---|---|---|---|
| 11,034,269 B2 | 6/2021 | Saigo et al. | |
| 2001/0011836 A1* | 8/2001 | Grey | B60N 2/002 296/214 |
| 2022/0187416 A1* | 6/2022 | Miu | G01S 13/931 |

FOREIGN PATENT DOCUMENTS

| DE | 10-2011-101164 B4 | 3/2016 | |
|---|---|---|---|
| JP | 5117122 B2 | 1/2013 | |
| KR | 102209813 B1 | 1/2021 | |
| KR | 20220075133 A * | 6/2022 | ............ B60W 40/08 |

* cited by examiner

*Primary Examiner* — Daniel J Colilla
(74) *Attorney, Agent, or Firm* — Fox Rothschild LLP (57) ABSTRACT Disclosed are an assist grip and a vehicle including the same. The assist grip includes a fixing part coupled to an interior of a vehicle, a grip part including a radar member that senses whether an object is present within a close distance, and connected to the fixing part to be rotatable, and a connection part connecting the grip part to the fixing part such that the grip part is rotatable.

14 Claims, 11 Drawing Sheets

ASSIST GRIP AND VEHICLE INCLUDING THE SAME

CROSS-REFERENCE TO RELATED APPLICATION

This application is based on and claims under 35 U.S.C. § 119 (a) the benefit of priority to Korean Patent Application No. 10-2021-0169195, filed in the Korean Intellectual Property Office on Nov. 30, 2021, the entire contents of which are incorporated herein by reference.

TECHNICAL FIELD

Embodiments of the present disclosure relates to an assist grip and a vehicle including the same.

BACKGROUND

In general, a vehicle is provided with a controller that electronically controls various devices, and receives information from a sensor, a switch, or the like installed in a vehicle and processes the provided information to perform a control function for enhancing a safety and a steering feel of the vehicle.

In particular, interiors of vehicles that have been developed recently are provided with a radar device for determining whether a passenger or an object is present in a passenger seat or a back seat. For example, when a safety belt is not fastened in spite that a radar device determines that a passenger is present, a controller may transmit an alarm sound or an alarm signal that suggests that a safety belt has to be fastened.

Conventionally, a separate component for installing a radar device inside a vehicle has to be manufactured or the radar device may be exposed to passengers in an interior of the vehicle to spoil an external appearance.

Meanwhile, an assist grip that is to be gripped by a passenger when the passenger gets on or off or is shaken may be provided in the interior of the vehicle. A conventional assist grip does not perform a separate function, except for a grip function.

SUMMARY

The present disclosure has been made to solve the above-mentioned problems occurring in the prior art while advantages achieved by the prior art are maintained intact.

An exemplary embodiment of the present disclosure provides an assist grip that may determine whether a passenger is present on a passenger seat or a back seat.

The technical problems to be solved by embodiments of the present disclosure are not limited to the aforementioned problems, and any other technical problems not mentioned herein will be clearly understood from the following description by those skilled in the art to which embodiments of the present disclosure pertain.

In one aspect, an assist grip is provided that comprises a) a fixing part adapted to be coupled to an interior of a vehicle; b) a grip part comprising a radar member configured to sense whether an object is present within a close distance, and connected to the fixing part to be rotatable; and c) a connection part connecting the grip part to the fixing part such that the grip part is rotatable.

In a further aspect, an assist grip includes a fixing part coupled to an interior of a vehicle, a grip part including a radar member that senses whether an object is present within a close distance, and connected to the fixing part to be rotatable, and a connection part connecting the grip part to the fixing part such that the grip part is rotatable.

In another example, the fixing part may include a fixing connector electrically connected to a battery of the vehicle, the connection part may include a first connection connector contacting the fixing connector and electrically connected to the fixing connector, a second connection connector being rotatable with respect to the first connection connector, and an electric wiring member electrically connecting the first connection connector and the second connection connector, and the grip part may include a grip connector contacting the second connection connector, electrically connected to the second connection connector, and that supplies electric power to the radar member.

In another example, the connection part may further include a first extension member extending in an opposite direction to a direction, the first connection connector faces the fixing connector from the first connection connector, a second extension member extending in an opposite direction to a direction, the second connection connector faces the grip connector from the second connection connector, and a rotation member connecting the first extension member and the second extension member such that the first extension member and the second extension member are rotatable with respect to each other.

In another example, the rotation member may be configured to provide a rotational restoring force that rotates the second extension member in a direction that becomes closer toward the first extension member when the second extension member is connected to the first extension member to be elastically rotatable with respect to the first extension member and the second extension member is rotated in a direction that becomes farther from the first extension member.

In another example, the connection part may further include a sensor member coupled to the second extension member and that senses a change in a location of the second extension member.

In another example, when a state, in which an angle between the first extension member and the second extension member is less a reference angle, is a closed state, and a state, in which the angle between the first extension member and the second extension member is more than the reference angle, is an opened state, the sensor member may include a switch part that senses whether there is pressing to operate the radar member, and a pressing part that presses the switch part in the opened state, and spaced apart from the switch part in the closed state.

In another example, the pressing part may be a torsion spring, and may be spaced apart from the switch part by a restoring force in the closed state.

In another example, the sensor member may be a gyro sensor.

In another example, the assist grip may further include a controller that controls an operation of the radar member, and when a state, in which an angle between the first extension member and the second extension member is less a reference angle, is a closed state, and a state, in which the angle between the first extension member and the second extension member is more than the reference angle, is an opened state, the controller operates the radar member in the closed state, and stops an operation of the radar member in the opened state.

In another example, the grip part may include a first grip member, to which the radar member is coupled, and extending forwards and rearwards, and second grip members extending from opposite ends of the first grip member in a direction that crosses a forward/rearward direction, and in which the connection part is connected to distal ends thereof.

In another example, the grip part may further include a pressure sensor coupled to the first grip member and that senses a pressure.

In another example, the assist grip may further include a controller that controls an operation of the radar member, and the controller may stop an operation of the radar member when the pressure sensor senses a pressure of more than a reference value and may operate the radar member when the pressure sensor senses a pressure of not more than the reference value.

In another example, the grip part may further include a biometric signal sensing sensor coupled to the first grip member, and that acquires information on a biometric signal of an object that contacts the first grip member.

In another example, the assist grip may further include a controller that controls an operation of the radar member, and the controller may stop an operation of the radar member when the biometric signal sensing sensor acquires the information on the biometric signal of the object that contacts the first grip member, and may operate the radar member when the biometric signal sensing sensor fails to acquire the information on the biometric signal of the object that contacts the first grip member.

In another example, a vehicle includes a vehicle body, and an assist grip coupled to the vehicle body and that is gripped by a passenger, and the assist grip includes a fixing part coupled to the vehicle body, and a grip part including a radar member that senses whether an object is present within a close distance.

As discussed, the system suitably includes use of a controller or processor.

In another aspect, vehicles are provided that comprise an apparatus as disclosed herein.

BRIEF DESCRIPTION OF THE DRAWINGS

The above and other objects, features and advantages of embodiments of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In providing reference numerals to the constituent elements of the drawings, the same elements may have the same reference numerals even if they are displayed on different drawings. Further, in the following description of the present disclosure, a detailed description of known functions and configurations incorporated herein will be omitted when it may make the subject matter of the present disclosure rather unclear.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
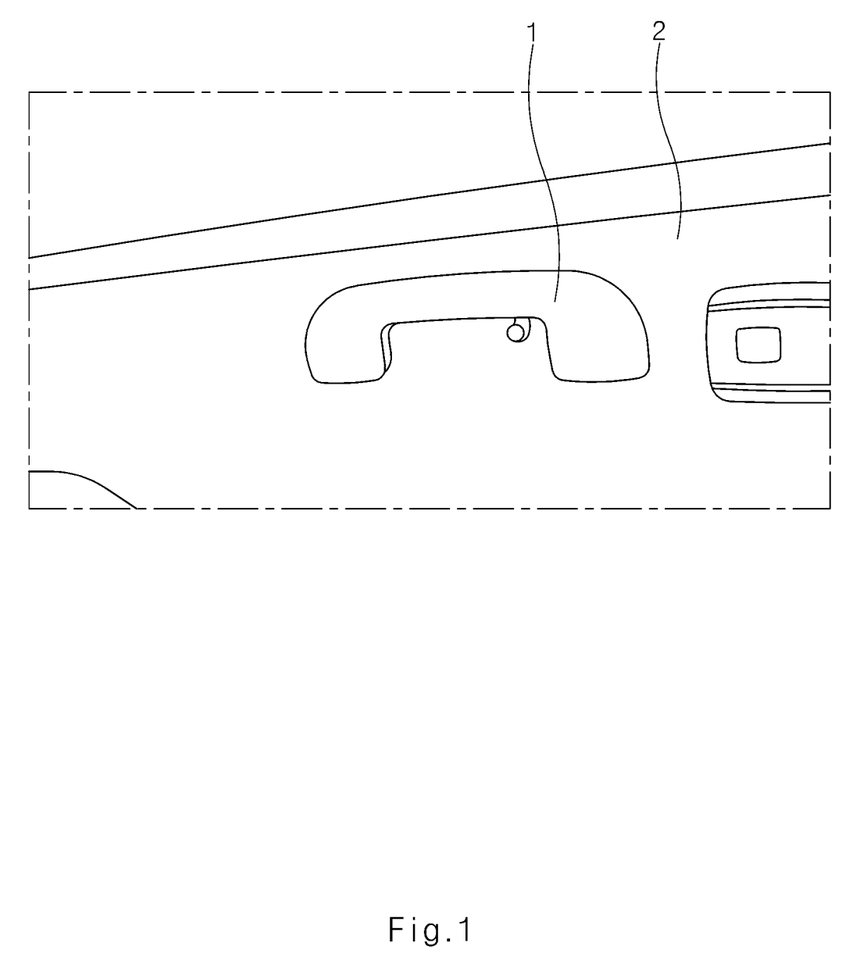
FIG. 1 is a view illustrating a general assist grip.
Figure 2:
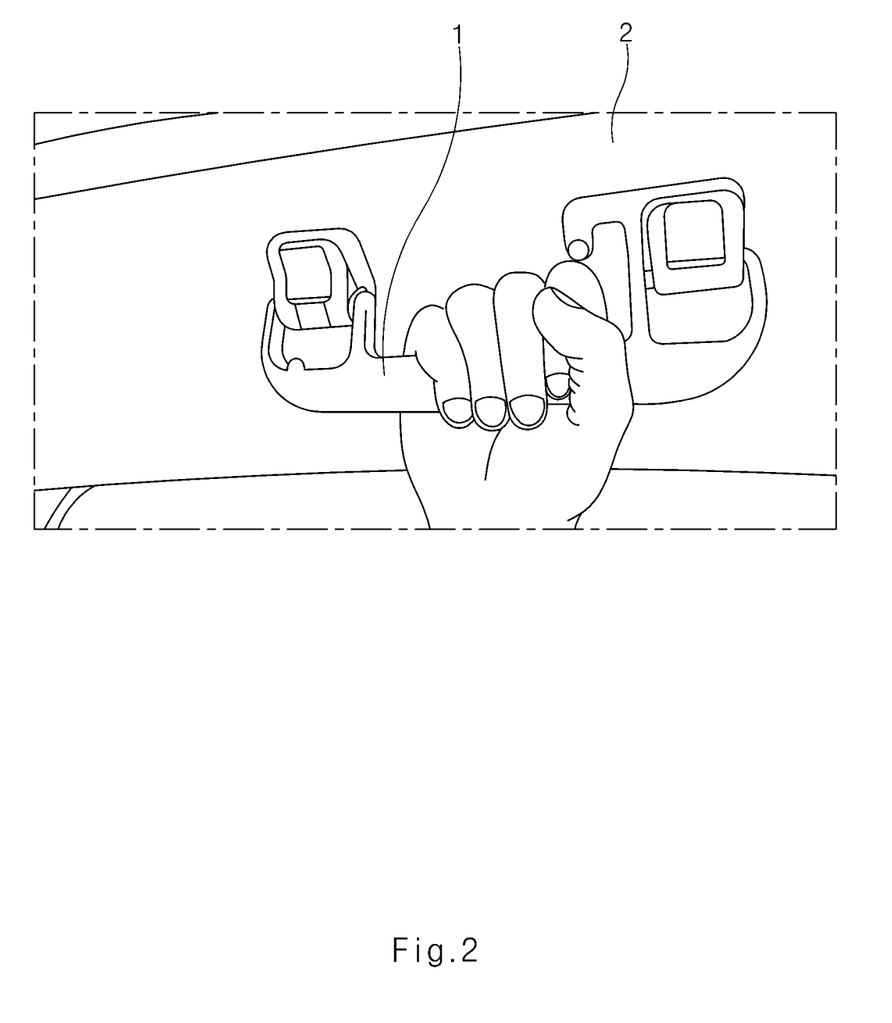
FIG. 2 is a view illustrating a state, in which a passenger grips the assist grip of FIG. 1.

An assist grip according to an exemplary embodiment of the present disclosure may be an assist grip that is disposed in an interior 2 of a vehicle like a general assist grip 1 of a vehicle to function to be caught by a passenger of a vehicle when the passenger gets on or off or is shaken. FIG. 1 is a view illustrating a general assist grip. FIG. 2 is a view illustrating a state, in which a passenger grips the assist grip of FIG. 1. As illustrated in FIGS. 1 and 2, a general assist grip 1 of a vehicle may be coupled to an interior 2 of the vehicle to be rotatable.

Figure 3:
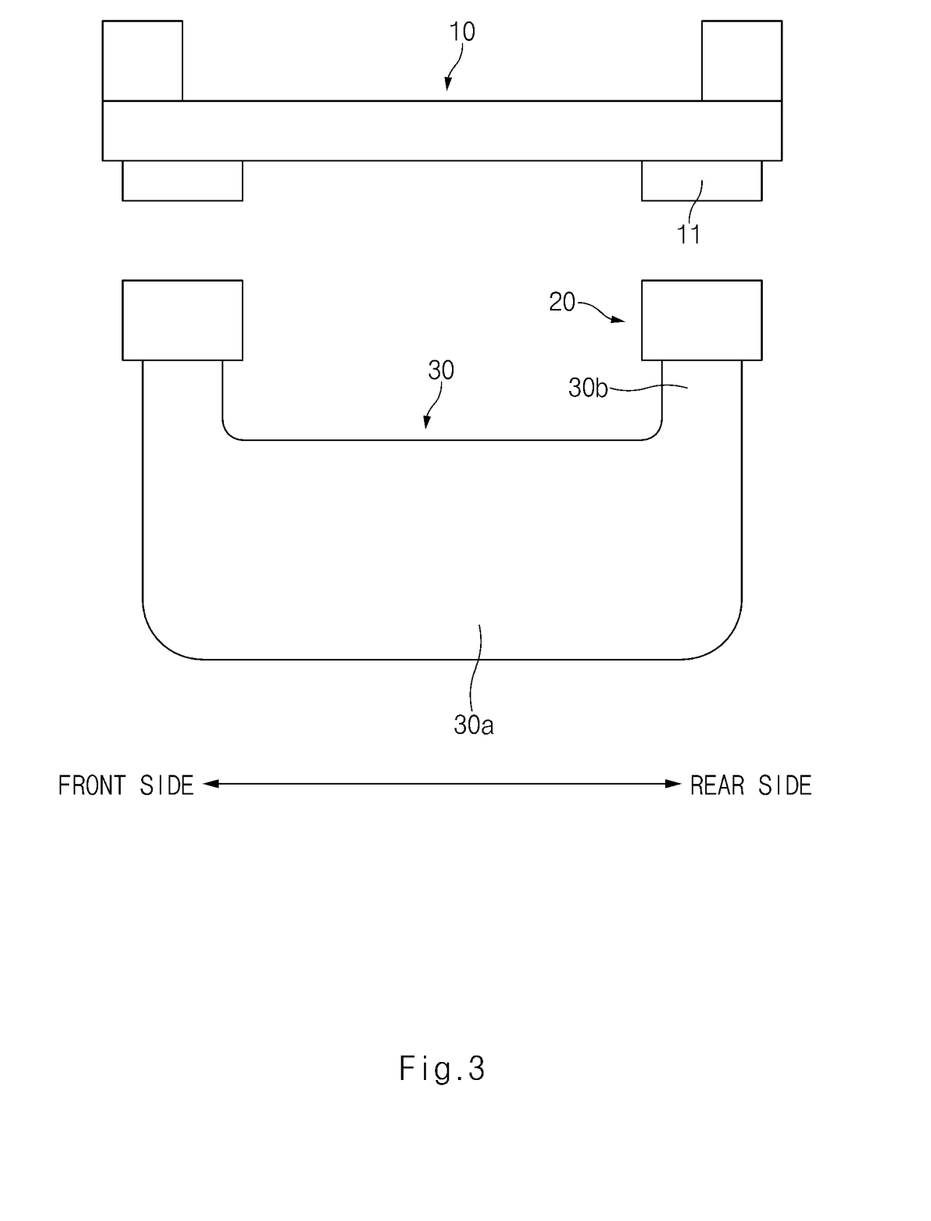
FIG. 3 is a view conceptually illustrating elements of an assist grip according to an exemplary embodiment of the present disclosure.
Figure 4:
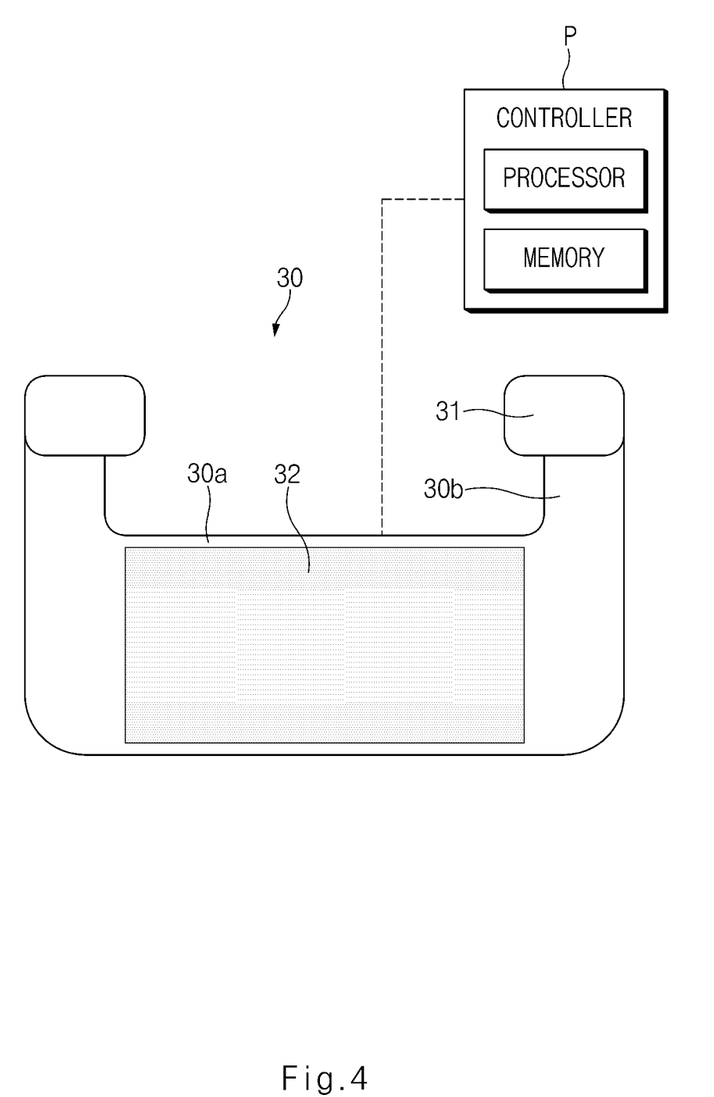
FIG. 4 is a view conceptually illustrating a grip part of an assist grip according to an exemplary embodiment of the present disclosure.
Figure 5:
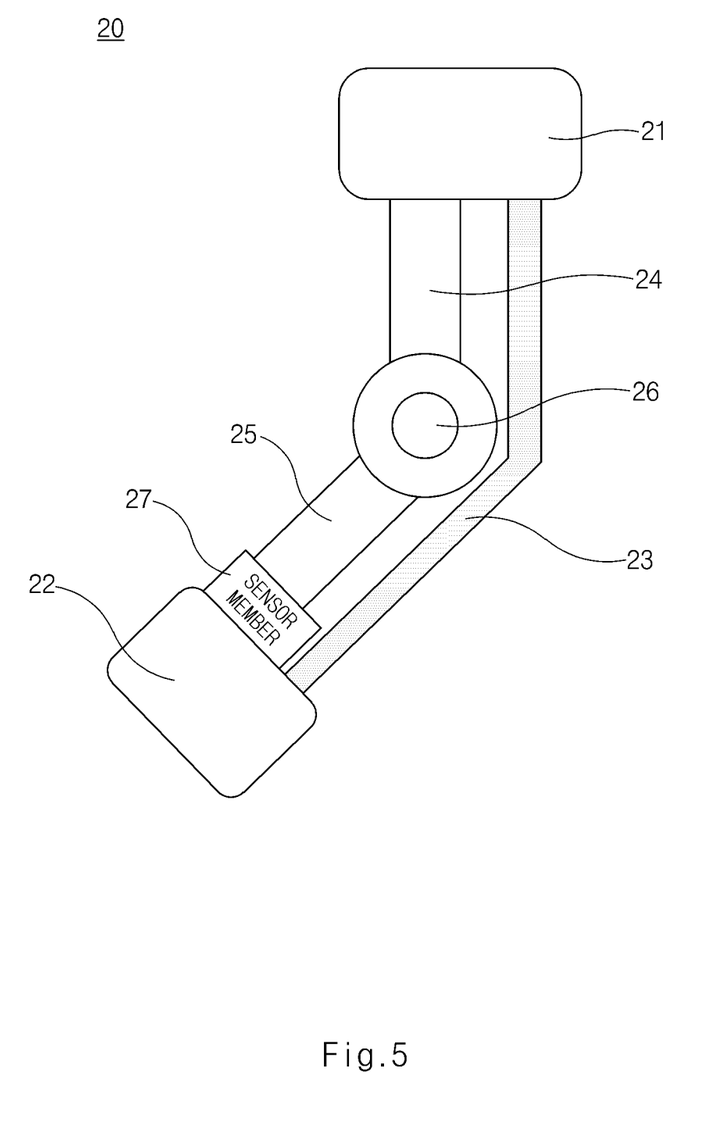
FIGS. 5 and 6 are views conceptually illustrating a connection part of an assist grip according to an exemplary embodiment of the present disclosure.
Figure 6:
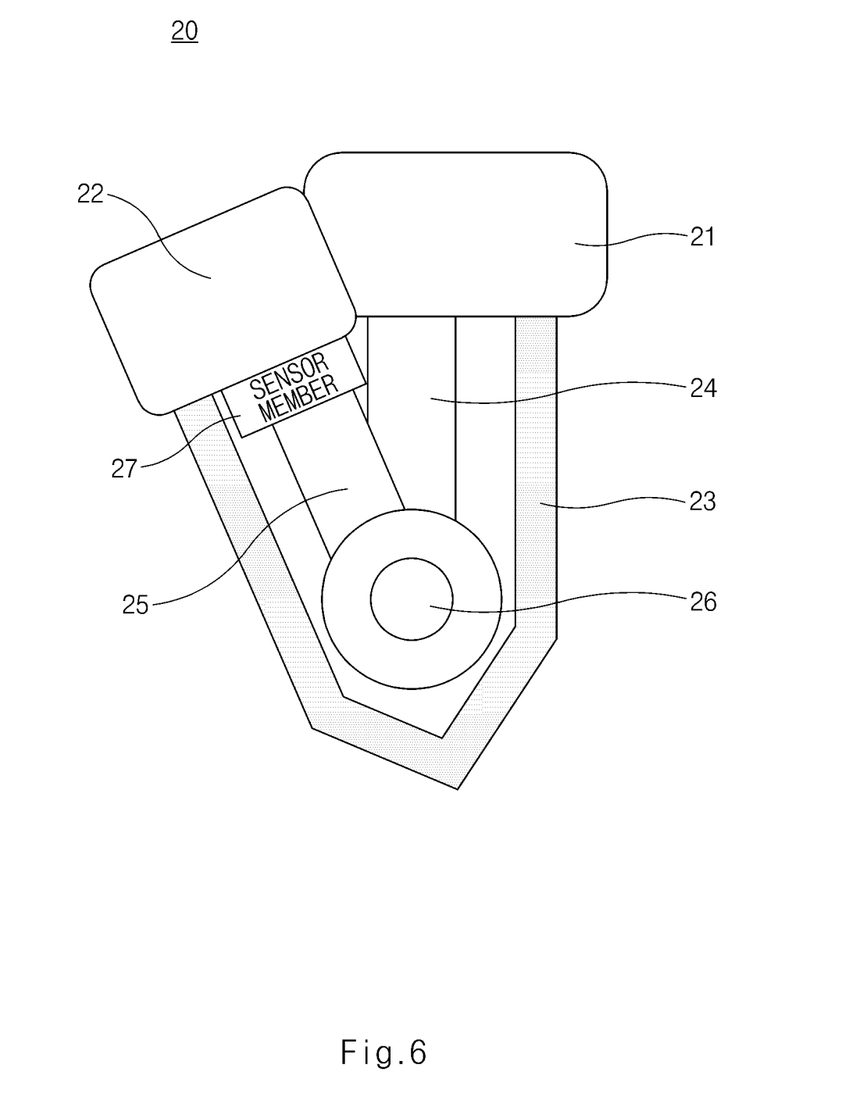

Furthermore, the assist grip according to the embodiment of the present disclosure may be an assist grip that may determine whether a passenger or an object is present in the interior of the vehicle. Hereafter, a structure of the assist grip for this purpose will be described below. FIG. 3 is a view conceptually illustrating elements of an assist grip according to an exemplary embodiment of the present disclosure. FIG. 4 is a view conceptually illustrating a grip part of an assist grip according to an exemplary embodiment of the present disclosure. FIGS. 5 and 6 are views conceptually illustrating a connection part of an assist grip according to an exemplary embodiment of the present disclosure.

The assist grip according to the embodiment of the present disclosure may include a fixing part 10, a grip part 30, and a connection part 20. The fixing part 10 may be coupled to an interior of the vehicle. The fixing part 10 may be a part that may be connected to the grip part 30, which will be described below, by the connection part 20, which will be described below, and to which the grip part 30 may be coupled to be rotatable. The fixing part 10 may include a fixing connector 11 electrically connected to a battery of the vehicle.

The grip part 30 may be connected to the fixing part 10 to be rotatable. The grip part 30 may be a part which a passenger may grip by using a hand. Furthermore, as illustrated in FIG. 4, the grip part 30 may include a radar member 32. The radar member 32 may be configured to sense whether an object is present in a close distance.

As an example, the radar member 32 may determine a location of a passenger based on an intensity of a radar signal reflected by one or more vehicle seats including media having different reflection characteristics. The radar member may include a transmitter and a receiver, and the transmitter and the receiver may be constituted separately or integrally.

The grip part 30 may include a first grip member 30a and second grip members 30b. The first grip member 30a may be a part, to which the radar member 32 is coupled and which extends forwards and rearwards. The second grip members 30b may be parts that extend from opposite ends of the first grip member 30a in a direction that crosses a forward/rearward direction, and in which the connection part 20 is connected to distal ends thereof.

The connection part 20 may connect the grip part 30 to the fixing part 10 such that the grip part 30 is rotatable. The connection part 20 may include a first connection connector 21, a second connection connector 22, and an electric wiring member 23. The first connection connector 21 may contact the fixing connector 11 and be electrically connected to the fixing connector 11. The second connection connector 22 may be rotatable with respect to the first connection connector 21. The electric wiring member 23 may electrically connect the first connection connector 21 and the second connection connector 22.

Hereinafter, the connection part 20 will be described below in detail.

As illustrated in FIGS. 5 and 6, the connection part 20 may further include a first extension member 24, a second extension member 25, and a rotation member 26. The first extension member 24 may be a member that extends in an opposite direction to a direction, in which the first connection connector 21 faces the fixing connector 11 from the first connection connector 21.

The second extension member 25 may be a member that extends in an opposite direction to a direction, in which the second connection connector 22 faces a grip connector 31 from the second connection connector 22.

The rotation member 26 may connect the first extension member 24 and the second extension member 25 such that they are rotatable with respect to each other. For example, the rotation member 26 may connect the first extension member 24 and the second extension member 25 such that the second extension member 25 is elastically rotatable with respect to the first extension member 24. The rotation member 26 may be a torsion spring.

The rotation member 26 may provide a rotational restoring force that rotates the second extension member 25 in a direction that becomes closer toward the first extension member 24 when the second extension member 25 is rotated in a direction that becomes farther away from the first extension member 24.

The connection part 20 may further include a sensor member 27. The sensor member 27 may be coupled to the second extension member 25 to sense a change in a location of the second extension member 25. The sensor member 27 may be configured to sense a closed state and an opened state.

The closed state may mean that an angle between the first extension member 24 and the second extension member 25 is less than a reference angle. Then, the reference angle may be the angle between the first extension member 24 and the second extension member 25 when the grip part 30 contacts the vehicle. This may be understood as states of FIGS. 1 and 6.

Furthermore, the opened state may mean that an angle between the first extension member 24 and the second extension member 25 is more than a reference angle. This may be understood as states of FIGS. 2 and 5.

The closed state and the opened state are determined to determine whether to operate the radar member by determining whether a passenger grips the grip part 30.

That is, because the state, in which the passenger grips the grip part 30, means that the passenger is already present in the interior of the vehicle, it may be determined that the passenger is present in the interior of the vehicle even without operating the radar member 32 then. Accordingly, when the grip part 30 is gripped, the operation of the radar member 32 may be stopped.

However, when the passenger does not grip the grip part 30, it has to be determined whether the passenger is present through the radar member 32. Accordingly, when the grip part 30 is not gripped, the radar member 32 has to be operated.

Figure 7:
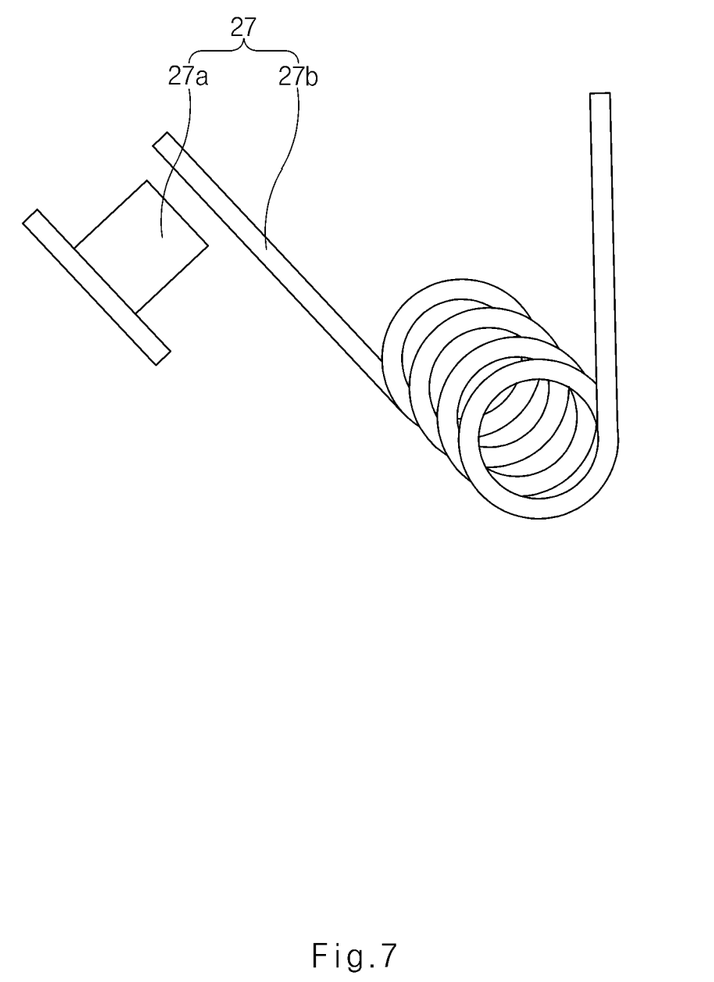
FIGS. 7 and 8 are views illustrating a switch part and a pressing part.
Figure 8:
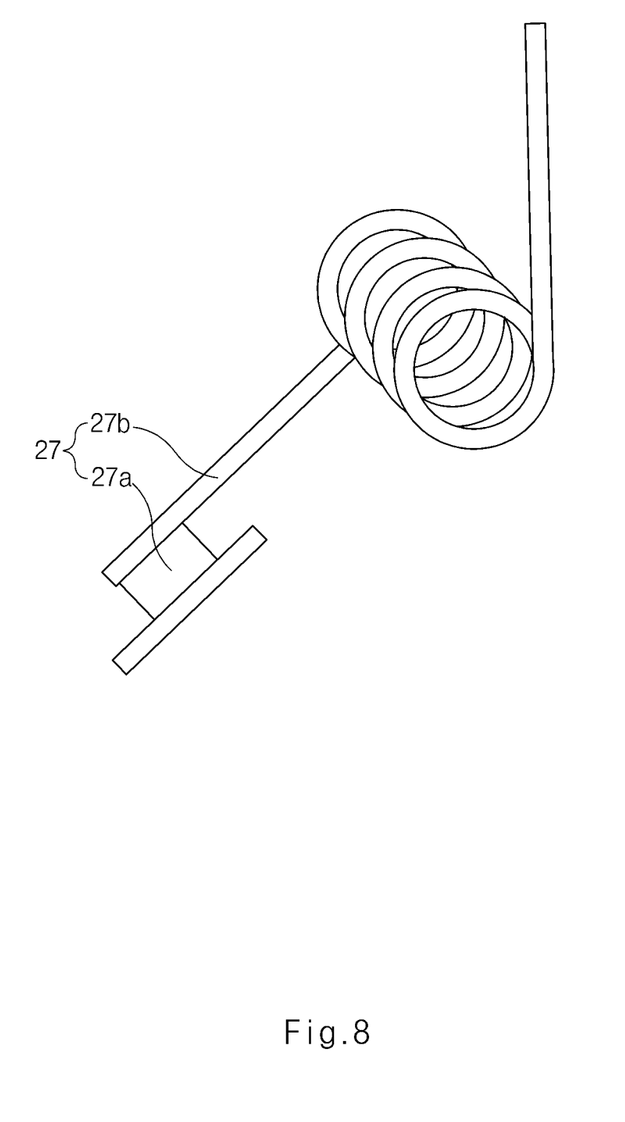

Meanwhile, the sensor member 27 may have various modifications. FIGS. 7 and 8 are views conceptually illustrating the sensor member 27 of the assist grip according to the embodiment of the present disclosure.

As an example, the sensor member 27 may include a switch part 27a and a pressing part 27b. FIGS. 7 and 8 are views illustrating a switch part and a pressing part.

The switch part 27a may be configured to operate the radar member 32 by sensing whether there is pressing. The pressing part 27b may be spaced apart from the switch part in the closed state. This may be understood as the state of FIG. 7. Furthermore, the pressing part 27b may be configured to press the switch part in the opened state. This may be understood as the state of FIG. 8. As an example, the pressing part may be a torsion spring, and may be spaced apart from the switch part by a restoring force in the closed state.

As another example, the sensor member 27 may be a gyro sensor. Because the gyro sensor may measure a location, it may determine whether the current states of the first extension member 24 and the second extension member 25 correspond to the closed state or the opened state, based on the location thereof.

<Controller "P">

The assist grip according to the embodiment of the present disclosure may further include a controller "P". The controller "P" may be configured to control an operation of the radar member 32. Then, the controller "P" may control the operation of the radar member 32 based on the angle between the first extension member 24 and the second extension member 25. As an example, the controller "P" may operate the radar member 32 in the closed state and may stop the operation of the radar member 32 in the opened state.

The controller "P" may include a processor and a memory. The processor may include a microprocessor such as a field programmable gate array (FPGA), an application specific integrated circuit (ASIC), a central processing unit (CPU). The memory may store control instructions that are basic in generating instructions for determining whether the radar member 32 is operated, by the processor. The memory may be data storage such as a hard disk drive (HDD), a solid state drive (SSD), a volatile medium, and a nonvolatile medium.

Hereinafter, another example of determining whether the passenger grips the grip part 30 will be described below.

Figure 9:
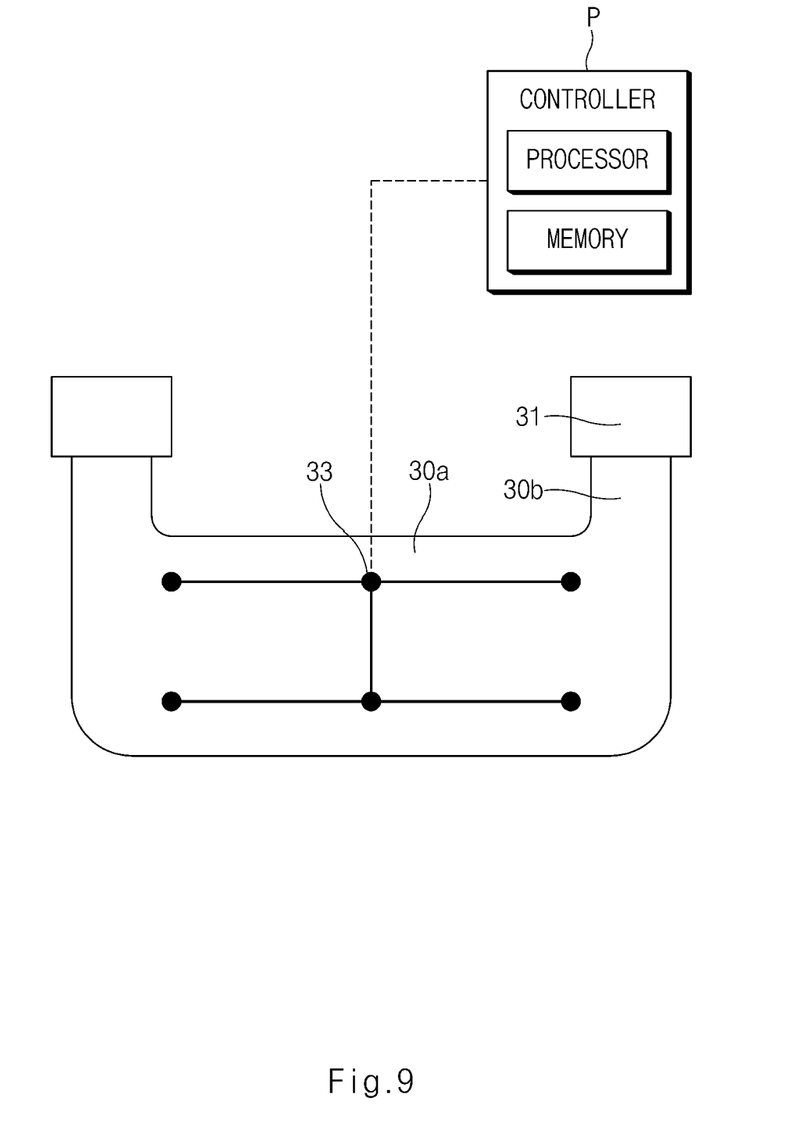
FIG. 9 is a perspective view of a contact part.

As an example, the grip part 30 may further include a pressure sensor 33. FIG. 9 is a view illustrating the grip part having the pressure sensor. For reference, the radar member is omitted in FIG. 9.

The pressure sensor 33 may be coupled to the first grip member 30a to detect a pressure applied.

The controller "P" may stop the operation of the radar member 32 when the pressure sensor 33 senses a pressure of more than a reference value. Furthermore, the radar member 32 may be operated when the pressure sensor 33 senses a pressure of not more than the reference value.

That is, because the fact that the pressure sensor 33 senses the pressure of more than the reference value may mean that the passenger grips the first grip member 30a, it may be that the passenger is already present in the interior of the vehicle. Accordingly, then, it may be determined that the passenger is already present in the interior of the vehicle without having to operate the radar member 32. Accordingly, when the pressure sensor senses the pressure of more than the reference value, the operation of the radar member 32 may be stopped.

However, when the pressure sensor 33 senses the pressure of not more than the reference value, it may be determined through the radar member 32 whether the passenger is present. Accordingly, when the grip part 30 is not gripped, the radar member 32 has to be operated.

Figure 10:
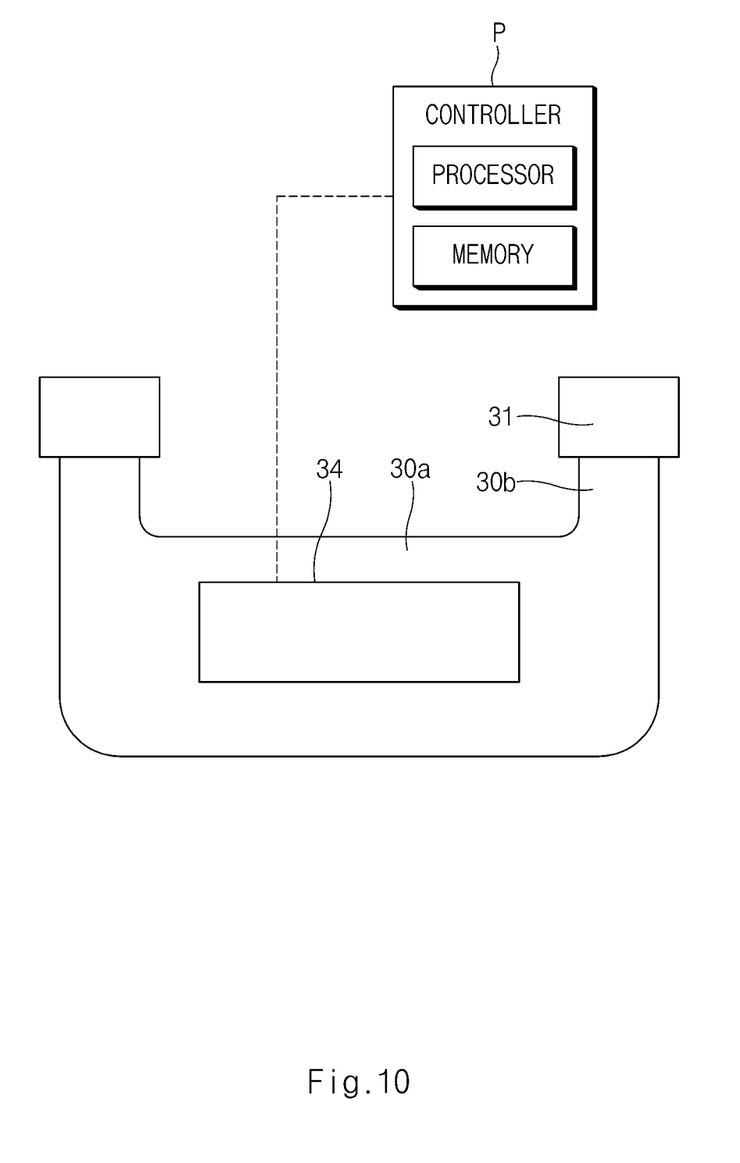
FIG. 10 is a view illustrating a second contact area and an insertion member.

As another example, the grip part 30 may include a biometric signal sensing sensor 34. FIG. 10 is a view illustrating the grip part having the biometric signal sensing sensor. For reference, the radar member is omitted in FIG. 10.

The biometric signal sensing sensor 34 may be coupled to the first grip member 30a to acquire information on a biometric signal of an object that contacts the first grip member 30a. Here, the biometric signal sensing sensor may mean a sensor that may sense biometric characteristics of living bodies, such as heart rates, electrocardiograms, and oxygen saturations.

The controller "P" may stop an operation of the radar member 32 when the biometric signal sensing sensor 34 acquires the information on the biometric signal of the object that contacts the first grip member 30a.

Furthermore, the controller "P" may operate the radar member 32 when the biometric signal sensing sensor 34 fails to acquire the information on the biometric signal of the object that contacts the first grip member 30a.

That is, because the fact that the biometric signal sensing sensor 34 acquires the information on the biometric signal may mean that the passenger grips the first grip member 30a, it may be that the passenger is already present in the interior of the vehicle. Accordingly, then, it may be determined that the passenger is already present in the interior of the vehicle without having to operate the radar member 32. Accordingly, when the pressure sensor senses the pressure of more than the reference value, the operation of the radar member 32 may be stopped.

However, when the biometric signal sensing sensor 34 fails to acquire information on the biometric signal of the object that contacts the first grip member 30a, it has to be determined through the radar member 32 whether a passenger is present. Accordingly, when the grip part 30 is not gripped, the radar member 32 has to be operated.

Figure 11:
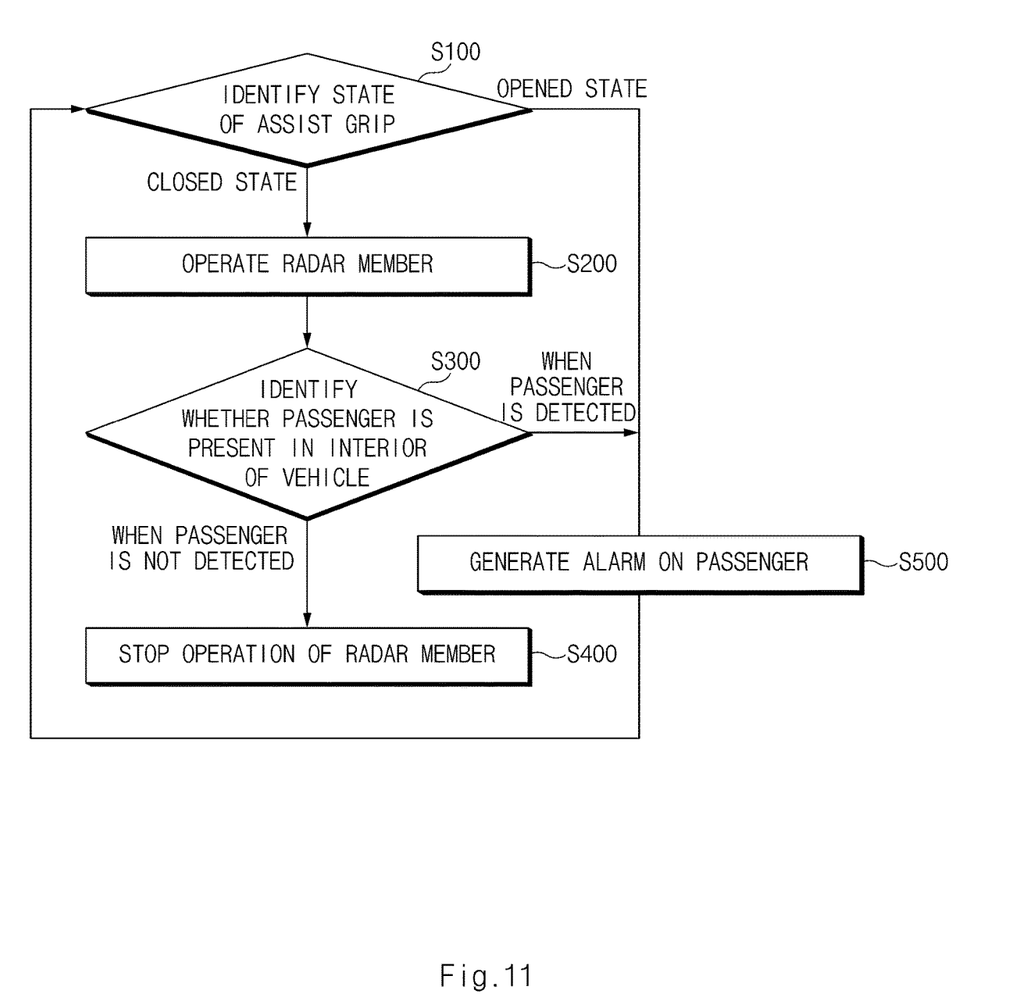
FIG. 11 is a flowchart illustrating an operation of a radar member of an assist grip according to an exemplary embodiment of the present disclosure.

FIG. 11 is a flowchart illustrating an operation of the radar member of the assist grip according to the embodiment of the present disclosure. Hereinafter, the radar member 32 of the assist grip according to the embodiment of the present disclosure will be described with reference to FIG. 11. As an example of an operation of the radar member 32, a process of generating an alarm on a passenger by determining whether the passenger is present by the radar member 32 will be described below.

First, it is determined whether the assist grip is in a closed state (S100). Then, when it is determined that the assist grip is in an opened state, it is immediately determined that the passenger is present, and an alarm on the passenger is generated (S500).

When it is determined that the assist grip is in the closed state, the radar member 32 is operated (S200). Then, when the radar member 32 is operated and it is identified that the passenger is present in the vehicle (S300), the alarm on the passenger is generated (S500). If it is identified that a passenger is not present in the vehicle, the operation of the radar member 32 is stopped (S400).

<Vehicle>

Hereinafter, a vehicle including the assist grip according to the embodiment of the present disclosure will be described below. For the contents on the assist grip, the above-described contents and the drawings may be referenced.

The vehicle according to the embodiment of the present disclosure may include a vehicle body and the assist grip. The assist grip may be coupled to the vehicle body to be gripped by a passenger.

The assist grip may include the fixing part 10 and the grip part 30. The grip part 30 may include the radar member 32.

The radar member 32 may be configured to sense whether an object is present in a close distance.

According to embodiments of the present disclosure because a radar device is mounted on an assist grip and may determine whether a passenger or an object is present in an interior of a vehicle when the assist grip is not gripped, the radar device may be conveniently installed, and an external appearance thereof may be improved.

Furthermore, according to the present disclosure, because a sensor is mounted on an assist grip and determines whether a passenger is present in an interior of a vehicle, it may be more accurately recognized whether a passenger is present.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. An assist grip comprising:
   a fixing part adapted to be coupled to an interior of a vehicle;
   a grip part comprising a radar member configured to sense whether an object is present within a close distance, and connected to the fixing part to be rotatable; and
   a connection part connecting the grip part to the fixing part such that the grip part is rotatable;
   wherein the fixing part comprises a fixing connector electrically connected to a battery of the vehicle,
   wherein the connection part comprises:
       a first connection connector contacting the fixing connector and electrically connected to the fixing connector;
       a second connection connector being rotatable with respect to the first connection connector; and
       an electric wiring member electrically connecting the first connection connector and the second connection connector; and
   wherein the grip part further comprises a grip connector contacting the second connection connector, electrically connected to the second connection connector, and configured to supply electric power to the radar member.

2. The assist grip of claim 1, wherein the connection part further comprises:
   a first extension member extending in an opposite direction to a direction, the first connection connector faces the fixing connector from the first connection connector;
   a second extension member extending in an opposite direction to a direction, the second connection connector faces the grip connector from the second connection connector; and
   a rotation member connecting the first extension member and the second extension member such that the first extension member and the second extension member are rotatable with respect to each other.

3. The assist grip of claim 2, wherein the rotation member is configured to provide a rotational restoring force that rotates the second extension member in a direction that becomes closer toward the first extension member when the second extension member is connected to the first extension member to be elastically rotatable with respect to the first extension member and the second extension member is rotated in a direction that becomes farther from the first extension member.

4. The assist grip of claim 2, wherein the connection part further comprises:
   a sensor member coupled to the second extension member and configured to sense a change in a location of the second extension member.

5. The assist grip of claim 4, wherein when a state, in which an angle between the first extension member and the second extension member is less a reference angle, is a closed state, and a state, in which the angle between the first extension member and the second extension member is more than the reference angle, is an opened state, the sensor member comprises:
   a switch part configured to sense whether there is pressing to operate the radar member; and
   a pressing part configured to press the switch part in the opened state and spaced apart from the switch part in the closed state.

6. The assist grip of claim 5, wherein the pressing part is a torsion spring and is spaced apart from the switch part by a restoring force in the closed state.

7. The assist grip of claim 4, wherein the sensor member is a gyro sensor.

8. The assist grip of claim 2, further comprising:
   a controller configured to control an operation of the radar member,
   wherein when a state, in which an angle between the first extension member and the second extension member is less than a reference angle, is a closed state, and a state, in which the angle between the first extension member and the second extension member is more than the reference angle, is an opened state, the controller operates the radar member in the closed state and stops an operation of the radar member in the opened state.

9. The assist grip of claim 1, wherein the grip part comprises:
   a first grip member, to which the radar member is coupled, and extending forwards and rearwards; and
   second grip members extending from opposite ends of the first grip member in a direction that crosses a forward/rearward direction, and in which the connection part is connected to distal ends thereof.

10. The assist grip of claim 9, wherein the grip part further comprises:
    a pressure sensor coupled to the first grip member and configured to sense a pressure.

11. The assist grip of claim 10, further comprising:
    a controller configured to:
        control an operation of the radar member;
        stop an operation of the radar member when the pressure sensor senses a pressure of more than a reference value; and
        operate the radar member when the pressure sensor senses a pressure of not more than the reference value.

12. The assist grip of claim 9, wherein the grip part further comprises:
    a biometric signal sensing sensor coupled to the first grip member and configured to acquire information on a biometric signal of an object that contacts the first grip member.

13. The assist grip of claim 12, further comprising:
a controller configured to:
  control an operation of the radar member;
  stop an operation of the radar member when the biometric signal sensing sensor acquires the information on the biometric signal of the object that contacts the first grip member; and
  operate the radar member when the biometric signal sensing sensor fails to acquire the information on the biometric signal of the object that contacts the first grip member.

14. A vehicle comprising:
a vehicle body; and
an assist grip coupled to the vehicle body and configured to be gripped by a passenger,
wherein the assist grip comprises:
  a fixing part coupled to the vehicle body;
  a grip part comprising a radar member configured to sense whether an object is present within a close distance; and
  a connection part connecting the grip part to the fixing part such that the grip part is rotatable;
wherein the fixing part comprises a fixing connector electrically connected to a battery of the vehicle,
wherein the connection part comprises:
  a first connection connector contacting the fixing connector and electrically connected to the fixing connector;
  a second connection connector being rotatable with respect to the first connection connector; and
  an electric wiring member electrically connecting the first connection connector and the second connection connector, and
wherein the grip part further comprises a grip connector contacting the second connection connector, electrically connected to the second connection connector, and configured to supply electric power to the radar member.

* * * * *